(12) United States Patent
Sugiura et al.

(10) Patent No.: US 12,516,731 B2
(45) Date of Patent: Jan. 6, 2026

(54) SLIDING MEMBER, MANUFACTURING METHOD THEREOF, AND COATING FILM

(71) Applicant: NIPPON PISTON RING CO., LTD., Saitama (JP)

(72) Inventors: Hiroyuki Sugiura, Saitama (JP); Takahiro Okazaki, Saitama (JP)

(73) Assignee: NIPPON PISTON RING CO., LTD., Saitama (JP)

( * ) Notice: Subject to any disclaimer, the term of this patent is extended or adjusted under 35 U.S.C. 154(b) by 295 days.

(21) Appl. No.: 18/283,948

(22) PCT Filed: Mar. 25, 2022

(86) PCT No.: PCT/JP2022/014470
§ 371 (c)(1),
(2) Date: Sep. 25, 2023

(87) PCT Pub. No.: WO2022/203052
PCT Pub. Date: Sep. 29, 2022

(65) Prior Publication Data
US 2024/0159313 A1 May 16, 2024

(30) Foreign Application Priority Data
Mar. 26, 2021 (JP) .................. 2021-053978

(51) Int. Cl.
C23C 14/00 (2006.01)
C23C 14/06 (2006.01)
(Continued)

(52) U.S. Cl.
CPC .............. *F16J 9/26* (2013.01); *C23C 14/0015* (2013.01); *C23C 14/0605* (2013.01); *C23C 14/54* (2013.01)

(58) Field of Classification Search
None
See application file for complete search history.

(56) References Cited

U.S. PATENT DOCUMENTS

2017/0306257 A1 10/2017 Moriguchi et al.
2018/0238450 A1 8/2018 Ooshiro et al.
(Continued)

FOREIGN PATENT DOCUMENTS

JP 2015-083875 A 4/2015
JP 2017-171988 A 9/2017
(Continued)

OTHER PUBLICATIONS

International Search Report for PCT/JP2022/014470 dated May 17, 2022 [PCT/ISA/210].
(Continued)

*Primary Examiner* — Kim S. Horger
(74) *Attorney, Agent, or Firm* — Sughrue Mion, PLLC

(57) ABSTRACT

A sliding member including a coating film in a sliding surface on a base material. The coating film includes, when a cross section thereof is observed by a bright-field TEM image, a laminated part configured by laminating, in a thickness direction, repeating units including black hard carbon layers and white hard carbon layers and a surface layer part composed of a white hard carbon layer provided on the laminated part. A Vickers hardness of the black hard carbon layer is within a range of 700 to 1600 HV, a Vickers hardness of the white hard carbon layer is higher than a Vickers hardness of the black hard carbon layer adjacent thereto and within a range of 1200 to 2200 HV, and a Vickers hardness of the surface layer part is lower than the Vickers hardness of the white hard carbon layer and within a range of 800 to 1200 HV.

10 Claims, 5 Drawing Sheets

(51) Int. Cl.
    *C23C 14/54*     (2006.01)
    *F16J 9/26*     (2006.01)

(56) References Cited

U.S. PATENT DOCUMENTS

| | | |
|---|---|---|
| 2018/0371608 A1 | 12/2018 | Moriguchi et al. |
| 2019/0100434 A1 | 4/2019 | Moriguchi et al. |
| 2020/0217416 A1 | 7/2020 | Okazaki et al. |

FOREIGN PATENT DOCUMENTS

| | | | |
|---|---|---|---|
| JP | 2018076958 A | * | 5/2018 |
| JP | 2018-127719 A | | 8/2018 |
| WO | 2016/042629 A1 | | 3/2016 |
| WO | 2017/026043 A1 | | 2/2017 |
| WO | 2017/104822 A1 | | 6/2017 |
| WO | 2018/235750 A1 | | 12/2018 |

OTHER PUBLICATIONS

Li, et al., " Multilayer DLC coating via alternating bias during magnetron sputtering", Elsevier, Thin Solid Films, vol. 519, 2011, pp. 4910-4916 (7 pages).
Extended European Search Report dated Nov. 20, 2023 in Application No. 22775833.1.

* cited by examiner

SLIDING MEMBER, MANUFACTURING METHOD THEREOF, AND COATING FILM

CROSS REFERENCE TO RELATED APPLICATIONS

This application is a National Stage of Application No. PCT/JP2022/014470 filed Mar. 25, 2022, claiming priority based on Japanese Patent Application No. 2021-053978 filed Mar. 26, 2021.

FIELD OF THE INVENTION

The present invention relates to a sliding member, a manufacturing method thereof, and a coating film. More specifically, the present invention relates to a sliding member exhibiting chipping resistance and wear resistance, having excellent peeling resistance (adhesion), and realizing a reduction in friction, a manufacturing method thereof, and a coating film.

BACKGROUND ART

In recent years, in various industrial fields, particularly in the automobile field, the study of hard carbon layers as coating films on surfaces of sliding members that require slidability, such as an engine base material or other machine base materials, is prevalent. The hard carbon layer is generally called by various names such as diamond-like carbon (DLC) layer, amorphous carbon layer, i-carbon layer, and diamond-like carbon layer. Such hard carbon layers are structurally classified as amorphous.

In the hard carbon layer, single bonds such as seen in diamond crystals, and double bonds such as seen in graphite crystals, are considered to co-exist. The hard carbon layer has properties such as high hardness, high wear resistance, and excellent chemical stability similar to those of the diamond crystals as well as properties such as low hardness, high lubricity, and excellent mated running-in property similar to those of the graphite crystals. Further, the hard carbon layer, being amorphous, has excellent flatness, low frictionality (that is, a small friction coefficient) in direct contact with a mated material, and excellent mated running-in property as well.

On a sliding surface of the sliding member, chipping resistance (defection resistance) and wear resistance are important properties. However, the chipping resistance (defection resistance) and wear resistance are in a trade-off relationship, making it difficult to provide a coating film that satisfies these. As means therefor, it has been studied that, a hard carbon layer having low hardness is provided, or a mixed layer of a hard carbon having low hardness and a hard carbon having high hardness is provided, achieving both chipping resistance and wear resistance.

Nevertheless, the present situation is that both chipping resistance and wear resistance are still not sufficiently achieved. In particular, even though a coating film provided to a sliding member such as a piston ring to which a high load is applied is required to have chipping resistance and wear resistance as well as low frictionality and peeling resistance, improvement of these properties is still insufficient. In recent years, various techniques have been proposed to address these issues.

For example, in Patent Document 1, there is proposed a technique that, even with a physical vapor deposition (PVD) method, makes it possible to form a thick hard carbon layer having excellent durability, and thus achieve both chipping resistance and wear resistance of the formed hard carbon layer and improve low frictionality and peeling resistance. This technique is one in which a coating film covers a surface of a base material and includes, when a cross section thereof is observed by a bright-field transmission electron microscope (TEM) image, a white hard carbon layer, relatively shown in white, and a black hard carbon layer, relatively shown in black, alternately laminated in a thickness direction and having a total film thickness greater than 1 μm and less than or equal to 50 μm, the white hard carbon layer including a region grown in a fan shape in the thickness direction.

Further, in Patent Document 2, there are proposed a sliding member including a coating film exhibiting constant and stable chipping resistance and wear resistance and having excellent peeling resistance (adhesion), and the coating film thereof. This technique is one in which a sliding member includes a coating film composed of a hard carbon layer on a sliding surface, and the coating film has, when a cross section thereof is observed by a bright-field TEM image, a thickness within a range of 1 μm to 50 μm, in repeating units including black hard carbon layers, relatively shown in black, and white hard carbon layers, relatively shown in white, and laminated in a thickness direction, the coating film including an inclined region, provided on a base material side, where thicknesses of the white hard carbon layers of the repeating units gradually increase in a thickness direction, and a homogeneous region, provided on a surface side, where thicknesses of the white hard carbon layers of the repeating units are the same or substantially the same in the thickness direction, the inclined region having a V-shaped or radially grown form in the thickness direction, and the homogeneous region not having a V-shaped or radially grown form in the thickness direction.

PRIOR ART DOCUMENTS

Patent Documents

Patent Document 1: International Publication WO2017/104822A1 Patent Document 2: International Publication WO2018/235750A1

SUMMARY OF THE INVENTION

Problems to be Solved by the Invention

A coating film on a sliding member is required to have chipping resistance, wear resistance, low frictionality, and other properties, and is further expected to achieve a reduction in friction (friction loss). A hard carbon layer is expected to be a material capable of realizing low friction. The present inventors have been studying the reduction of friction, especially with regard to a surface layer having an excellent running-in property with respect to a mated member in the early stages of sliding.

An object of the present invention is to provide a new sliding member exhibiting chipping resistance and wear resistance, having excellent peeling resistance (adhesion), and realizing a reduction in friction, a manufacturing method thereof, and a coating film.

Means for Solving the Problems (1) A sliding member according to the present invention comprises a coating film on a sliding surface on a base material. The coating film includes, when a cross section thereof is observed by a bright-field TEM image, a laminated part configured by laminating, in a thickness direction, repeating units including black hard carbon layers, relatively shown in black, and white hard carbon layers, relatively shown in white, and a surface layer part composed of a white hard carbon layer provided on the laminated part. A Vickers hardness of the black hard carbon layer is within a range of 700 to 1600 HV, a Vickers hardness of the white hard carbon layer is higher than a Vickers hardness of the black hard carbon layer adjacent thereto and within a range of 1200 to 2200 HV, and a Vickers hardness of the surface layer part is lower than the Vickers hardness of the white hard carbon layer and within a range of 800 to 1200 HV.

Similar to the related art, in the laminated part, the black hard carbon layers relatively have high density and a small $[sp^2/(sp^2+sp^3)]$ ratio, and are excellent in strength. The white hard carbon layers relatively have low density and a large $[sp^2/(sp^2+sp^3)]$ ratio, and are excellent in low frictionality and chipping resistance. However, in the black hard carbon layer and the white hard carbon layer adjacent to each other, the laminated part of the present invention has a hardness of the white hard carbon layer higher than that of the black hard carbon layer, unlike the related art. By providing a coating film that is a laminate of these hard carbon layers on the sliding surface, it is possible to obtain a sliding member excellent in chipping resistance, wear resistance, and peeling resistance (adhesion) on the basis of a laminating effect of the hard carbon layers having different properties. Furthermore, in the present invention, the surface layer part, composed of a white hard carbon layer, has a hardness in a low range within the range of that of the black hard carbon layer, making it possible to realize a reduction in friction when brought into contact with a mated member in the early stages of sliding.

In the sliding member according to the present invention, $[sp^2/(sp^2+sp^3)]$ ratios of the black hard carbon layer and the white hard carbon layer adjacent to each other and an $[sp^2/(sp^2+sp^3)]$ ratio of the surface layer are such that [the black hard carbon layer<the white hard carbon layer≤the surface layer part] or [the black hard carbon layer<the surface layer part≤the white hard carbon layer].

According to this invention, of the $[sp^2/(sp^2+sp^3)]$ ratios of the black hard carbon layer and white hard carbon layer adjacent to each other in the laminated part, the ratio of the white hard carbon layer is larger than that of the black hard carbon layer and, on the basis of a laminating effect of the hard carbon layers having different properties, a sliding member excellent in chipping resistance, wear resistance, and peeling resistance (adhesion) can be obtained. Furthermore, the $[sp^2/(sp^2+sp^3)]$ ratio of the surface layer part composed of the white hard carbon layer is larger than that of the black hard carbon layer and about the same as that of the white hard carbon layer. Such a surface layer part can realize a reduction in friction when brought into contact with a mated member in the early stages of sliding.

In the sliding member according to the present invention, the surface layer part has a thickness within a range of 0.1 to 1.0 μm, and the repeating unit has a thickness within a range of 0.2 to 2 μm.

In the sliding member according to the present invention, the $[sp^2/(sp^2+sp^3)]$ ratio of the black hard carbon layer is within a range of 0.05 to 0.75, the $[sp^2/(sp^2+sp^3)]$ ratio of the white hard carbon layer is larger than the $[sp^2/(sp^2+sp^3)]$ ratio of the black hard carbon layer and within a range of 0.20 to 0.80, and the $[sp^2/(sp^2+sp^3)]$ ratio of the surface layer part is within a range of 0.20 to 0.80.

Preferably, the sliding member according to the present invention further comprises a carbon layer directly below the black hard carbon layer and/or directly below the white hard carbon layer.

In the sliding member according to the present invention, when a cross section thereof is observed by a bright-field TEM image, a hard carbon base film may be provided between the base material or an intermediate layer provided on the base material, and the coating film.

In the sliding member according to the present invention, the sliding member is a piston ring.

(2) A manufacturing method of the sliding member according to the present invention is a manufacturing method of a sliding member according to the present invention described above that includes the coating film on the sliding surface on the base material, the coating film including, when a cross section thereof is observed by a bright-field TEM image, a laminated part configured by laminating, in a thickness direction, repeating units including black hard carbon layers, relatively shown in black, and white hard carbon layers, relatively shown in white, and a surface layer part composed of a white hard carbon layer provided on the laminated part. The manufacturing method comprises forming the coating film with a film forming temperature of the surface layer part being higher than a film forming temperature of the laminated part.

(3) A coating film according to the present invention comprises, when a cross section thereof is observed by a bright-field TEM image, a laminated part configured by laminating, in a thickness direction, repeating units including black hard carbon layers, relatively shown in black, and white hard carbon layers, relatively shown in white, and a surface layer part composed of a white hard carbon layer provided on the laminated part. A Vickers hardness of the black hard carbon layer is within a range of 700 to 1600 HV, a Vickers hardness of the white hard carbon layer is higher than a Vickers hardness of the black hard carbon layer adjacent thereto and within a range of 1200 to 2200 HV, and a Vickers hardness of the surface layer part is lower than the Vickers hardness of the white hard carbon layer and within a range of 800 to 1200 HV.

In the coating film according to the present invention, $[sp^2/(sp^2+sp^3)]$ ratios of the black hard carbon layer and the white hard carbon layer adjacent to each other and an $[sp^2/(sp^2+sp^3)]$ ratio of the surface layer are such that [the black hard carbon layer<the white hard carbon layer≤the surface layer part] or [the black hard carbon layer<the surface layer part≤the white hard carbon layer].

Effect of the Invention

According to the present invention, it is possible to provide a new sliding member exhibiting chipping resistance and wear resistance, having excellent peeling resistance (adhesion), and realizing a reduction in friction, a manufacturing method thereof, and a coating film, particularly as a sliding member such as a piston ring to which a high load is applied and a coating film.

EMBODIMENTS OF THE INVENTION

A sliding member, a manufacturing method thereof, and a coating film according to the present invention will now be described in detail with reference to the drawings. It should be noted that the present invention is not limited only to the following descriptions and drawings, and modifications within the scope of the gist are also included.

[Sliding Member]

Figure 6:
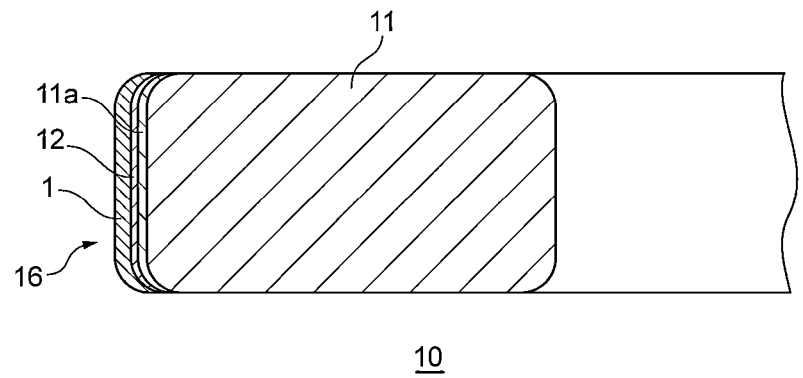
FIG. 6 is a schematic sectional view illustrating an example of a piston ring including the coating film.

A sliding member 10 according to the present invention is, for example, the sliding member 10 including a coating film 1 on a sliding surface 16, as illustrated in the example of a piston ring in FIG. 6. The coating film 1 includes, when a cross section thereof is observed by a bright-field TEM image, a laminated part 1A configured by laminating, in a thickness direction Y, repeating units (denoted by an asterisk (*) in FIGS. 2A and 2B and FIGS. 3A and 3B) including black hard carbon layers B, relatively shown in black, and white hard carbon layers W, relatively shown in white, and a surface layer part 1C composed of a white hard carbon layer provided on the laminated part 1A. With regard to hardness, a Vickers hardness of the black hard carbon layer B is within a range of 700 to 1600 HV, a Vickers hardness of the white hard carbon layer W is higher than a Vickers hardness of the black hard carbon layer B adjacent thereto and within a range of 1200 to 2200 HV, and a Vickers hardness of the surface layer part 1C is lower than the Vickers hardness of the white hard carbon layer W and within a range of 800 to 1200 HV.

In the coating film 1 constituting such a sliding member 10, in the laminated part 1A, similar to the related art, the black hard carbon layers B relatively have high density and a small $sp^2/sp^3$ ratio, and are excellent in strength, and the white hard carbon layers relatively have low density and a large $sp^2/sp^3$ ratio, and are excellent in low frictionality and chipping resistance. However, this laminated part 1A, in the black hard carbon layer B and the white hard carbon layer W adjacent to each other, has a hardness of the white hard carbon layer W higher than that of the black hard carbon layer B, unlike the related art. By providing the laminated part 1A that is a laminate of these hard carbon layers B, W on the sliding surface 16, it is possible to obtain the sliding member 10 excellent in chipping resistance, wear resistance, and peeling resistance (adhesion) on the basis of a laminating effect of the hard carbon layers having different properties. Furthermore, the surface layer part 1C, composed of a white hard carbon layer, has a hardness in a low range within the range of that of the black hard carbon layer B, making it possible to realize a reduction in friction when brought into contact with a mated member in the early stages of sliding.

It should be noted that the bright-field TEM image can be obtained by observing the coating film 1 thinned by using a focused ion beam (FIB) through a transmission electron microscope (TEM) at an acceleration voltage of 300 kV, for example. The thickness direction Y refers to the direction in which the laminated part 1A and the surface layer part 1C are sequentially laminated on a base material 11.

The following describes the components of the sliding member in detail. It should be noted that although, in the following, descriptions are often made using a piston ring as an example of the sliding member, the sliding member according to the present invention is not limited to the piston ring. Further, the [$sp^2/(sp^2+sp^3)$] ratio may be abbreviated as "$sp^2/sp^3$ ratio."

(Base Material)

The base material 11 is a target member on which the coating film 1 is provided, as illustrated in FIG. 1, FIGS. 2A and 2B, and FIGS. 3A and 3B. Examples of the base material 11, while not particularly limited, include a ferrous metal, a non-ferrous metal, ceramic, a hard composite material, and the like. For example, carbon steel, alloy steel, quenched steel, high-speed tool steel, cast iron, aluminum alloy, magnesium alloy, cemented carbide, and the like can be included. It should be noted that, in consideration of the film forming temperature of the coating film 1, a base material having properties that do not significantly deteriorate at a temperature exceeding 200° C. is preferred.

Examples of the piston ring base material 11 in a case in which the coating film 1 is applied to the piston ring 10 include various materials used as the base material of the piston ring 10, and the material is not particularly limited. For example, various steel materials, stainless steel materials, casting materials, cast steel materials, and the like can be applied. Among these, a martensitic stainless steel, a chromium-manganese steel (SUPS material), a chrome-vanadium steel (SUP 10 material), a silicon-chromium steel (SWOSC-V material), and the like can be included. This base material 11 may include an underlayer 11a illustrated in FIG. 1 as necessary. Examples of such an underlayer 11a include an underlayer that increases the adhesion with an intermediate layer 12 described below or the like, and the underlayer is not particularly limited.

The piston ring base material 11 may be provided with a layer composed of nitride, carbonitride, carbide, or the like, containing at least one of Cr, Ti, Si, Al, and the like as the underlayer 11a in advance. Examples of such a compound layer include CrN, TiN, CrAlN, TiC, TiCN, TiAlSiN, and the like. Among these, preferably, a nitrided layer (not illustrated) formed by performing a nitriding treatment, and a Cr—N based, a Cr—B—N based, a Ti—N based wear-resistant film, and the like (not illustrated) can be included. Further, among these, a Cr—N based, a Cr—B—N based, a Ti—N based wear-resistant film, or the like is preferably formed. It should be noted that the piston ring 10 exhibits excellent wear resistance even if such a nitriding treatment or formation of a Cr or Ti based wear-resistant film is performed, and thus the nitriding treatment and formation of the Cr or Ti based wear-resistant film are not necessary.

The piston ring base material 11 may be pretreated as necessary. Such a pretreatment is preferably performed by polishing the surface to adjust surface roughness. Adjustment of the surface roughness is preferably performed by, for example, methods such as lapping and polishing the surface of the piston ring base material 11 using diamond abrasive grains. Such a piston ring base material 11 can be preferably applied as a pretreatment before formation of the intermediate layer 12 and the like described below, or as a pretreatment for the underlayer 11a and the like provided in advance before formation of the intermediate layer 12 and the like.

(Intermediate Layer)

The intermediate layer 12 is preferably provided as necessary between the base material 11 and the coating film 1, as illustrated in FIG. 1, FIGS. 2A and 2B, and FIGS. 3A and 3B. By this intermediate layer 12, the adhesion between the base material 11 and the coating film 1 can be improved.

Examples of the intermediate layer 12 include a layer containing at least one or two or more elements of Cr, Ti, Si, W, B, and the like. It should be noted that the underlayer 11a composed of a compound such as nitride, carbonitride, or carbide, and including at least one or two or more elements of Cr, Ti, Si, Al, and the like, may be provided below the intermediate layer 12 (between the base material 11 and the intermediate layer 12). Examples of such a compound include CrN, TiN, CrAlN, TiC, TiCN, TiAlSiN, and the like. It should be noted that the underlayer 11a provided with the intermediate layer 12 as necessary can be formed by means such as a vacuum deposition method or an ion plating method of setting the base material 11 into a chamber, evacuating the chamber, subsequently performing pre-heating, ion cleaning, and the like, and introducing an inert gas, nitrogen gas, or the like, for example.

Examples of the intermediate layer 12 in a case in which the coating film 1 is applied to the piston ring 10 include a titanium film, a chromium film, or the like. The intermediate layer 12 in this case need not necessarily be provided as well, and thus formation is optional. The intermediate layer 12 composed of a titanium film, a chromium film, or the like can be formed by various film forming means such as a vacuum deposition method, a sputtering method, and an ion plating method. For example, the intermediate layer 12 can be formed by setting the piston ring base material 11 into a chamber, evacuating the chamber, subsequently performing pre-heating, ion cleaning, and the like, and introducing an inert gas. While not particularly limited, a thickness of the intermediate layer 12 is preferably within a range of 0.05 μm or more and 2 μm or less. It should be noted that, while the intermediate layer 12 is preferably formed on at least the outer peripheral sliding surface 16 on which the piston ring 10 slides upon contact with a cylinder liner (not illustrated), the intermediate layer 12 may be formed on other surfaces, such as an upper surface, a lower surface, or an inner peripheral surface of the piston ring 10, for example.

This intermediate layer 12 may be directly formed on the piston ring base material 11, or may be formed on the above-mentioned surface after the nitriding treatment, or on the underlayer 11a composed of an wear-resistant film. The intermediate layer 12 can improve the adhesion between the piston ring base material 11 and the coating film 1. It should be noted that, in order to improve the adhesion and the like between the intermediate layer 12 and the coating film 1 as well, another layer may be provided as needed. For example, a film having the same or substantially the same components as those of the coating film 1 described below may be formed as a hard carbon base film.

(Coating Film)

The coating film 1 is constituted by the laminated part 1A and the surface layer part 1C, as illustrated in FIGS. 2A and 2B, FIGS. 3A and 3B, and FIGS. 4 and 5. The laminated part 1A includes two types of hard carbon layers W, B relatively shown in the two colors white and black when a bright-field TEM image of the cross section is observed. The black hard carbon layer B and the white hard carbon layer W are laminated to form a repeating unit (denoted by an asterisk (*) in FIGS. 2A and 2B and FIGS. 3A and 3B), and the repeating units are laminated in the thickness direction Y to constitute the laminated part 1A. The surface layer part 1C is a white hard carbon layer provided on the laminated part 1A. It should be noted that "relatively" refers to the relative relationship of the hues when the cross section is observed by the bright-field TEM image, and the layer that looks black is the "black hard carbon layer B" and the layer that looks white is the "white hard carbon layer W."

In a case in which the coating film 1 is applied to the piston ring 10, the coating film 1 is formed on at least the outer peripheral sliding surface 16 on which the piston ring 10 slides upon contact with a cylinder liner (not illustrated), as illustrated in FIG. 6. It should be noted that the coating film 1 may be optionally formed on other surfaces, such as the upper surface, the lower surface, and the inner peripheral surface of the piston ring 10, for example, as well.

(Laminated Part)

Figure 1:
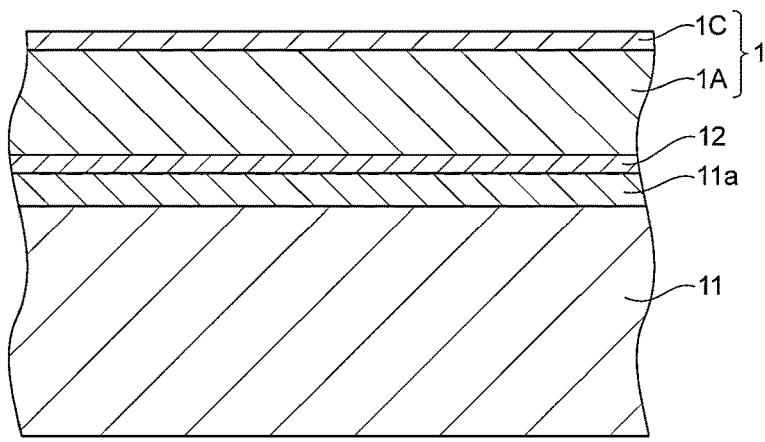
FIG. 1 is a schematic sectional view illustrating an example of a coating film provided to a sliding member according to the present invention.
Figure 2A:
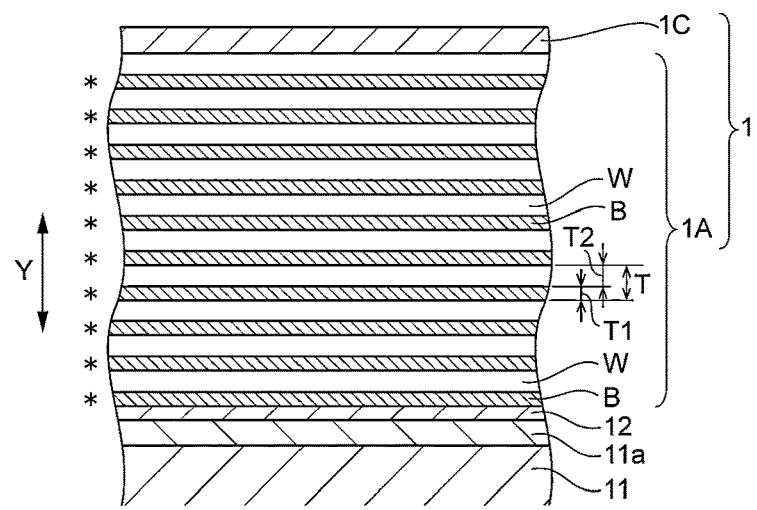
FIGS. 2A and 2B are explanatory views illustrating an example of the coating film, FIG. 2A being a sectional form example provided with a laminated part configured by laminating a repeating unit obtained by forming a black hard carbon layer B and then forming a white hard carbon layer W thereon, and a surface layer on the laminated part, and FIG. 2B being a sectional form example provided with a laminated part configured by laminating a repeating unit obtained by forming the white hard carbon layer W and then forming the black hard carbon layer B thereon, and a surface layer on the laminated part.
Figure 2B:
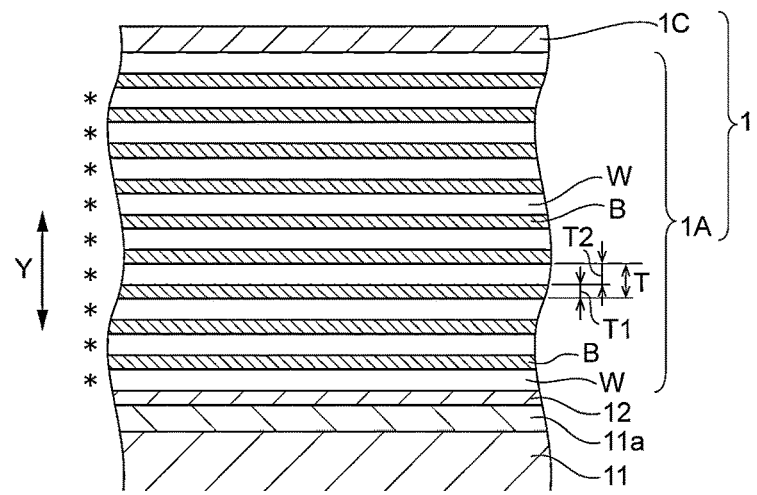
Figure 3A:
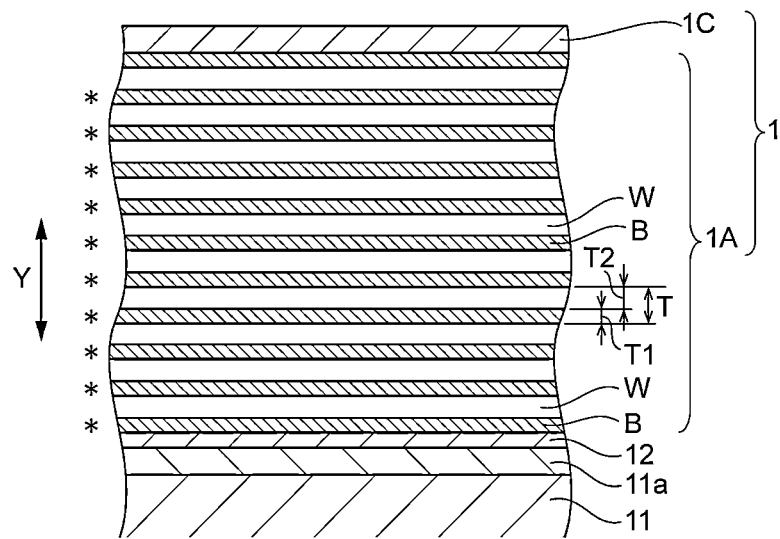
FIGS. 3A and 3B are explanatory views illustrating another example of the coating film, FIG. 3A being a sectional form example provided with a laminated part configured by laminating a repeating unit obtained by forming a black hard carbon layer B and then forming a white hard carbon layer W thereon, and a surface layer on the laminated part, and FIG. 3B being a sectional form example provided with a laminated part configured by laminating a repeating unit obtained by forming the white hard carbon layer W and then forming the black hard carbon layer B thereon, and a surface layer on the laminated part.
Figure 3B:
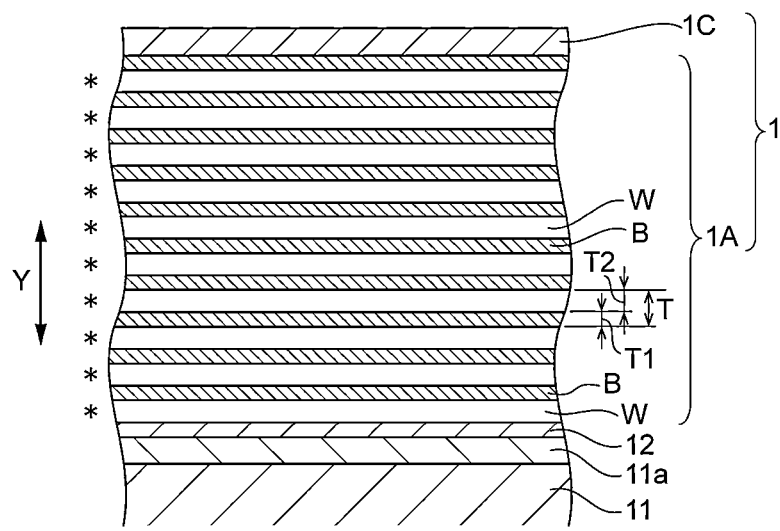

The laminated part 1A, as illustrated in FIGS. 2A and 2B and FIGS. 3A and 3B, is formed by laminating the repeating units of the black hard carbon layer B and the white hard carbon layer W, and the laminated order is not particularly limited. A repeating unit obtained by forming the black hard carbon layer B and then forming the white hard carbon layer W thereon may be laminated as illustrated in FIG. 2A and FIG. 3A, and a repeating unit obtained by forming the white hard carbon layer W and then forming the black hard carbon layer B thereon may be laminated as illustrated in FIG. 2B and FIG. 3B. The repeating unit may be either of the forms illustrated in FIGS. 2A and 2B and FIGS. 3A and 3B, and the black hard carbon layer B and the white hard carbon layer W constituting the repeating unit are formed in an adjacent manner. It should be noted that the difference between FIGS. 2A and 2B and FIGS. 3A and 3B is that the layer directly below the surface layer part 1C is the white hard carbon layer W in FIGS. 2A and 2B, and is the black hard carbon layer B in FIGS. 3A and 3B.

The black hard carbon layer B, similar to the related art, relatively has high density and a small $sp^2/sp^3$ ratio and is excellent in strength, and the white hard carbon layer relatively has low density and a large $sp^2/sp^3$ ratio and is excellent in low frictionality and chipping resistance. However, the laminated part 1A constituting the coating film 1 of the present invention has a hardness different from that of the related art and, in the black hard carbon layer B and the white hard carbon layer W adjacent to each other, the white hard carbon layer W has a hardness higher than that of the black hard carbon layer B. That is, the black hard carbon layer B has low hardness and high density in comparison to those of the white hard carbon layer W adjacent thereto. Conversely, the white hard carbon layer W has high hardness and low density in comparison to those of the black hard carbon layer B adjacent thereto.

The $sp^2/sp^3$ ratio is larger in the white hard carbon layer W than in the black hard carbon layer B. More specifically, the black hard carbon layer B has low hardness, a small $sp^2/sp^3$ ratio, and high density compared to those of the adjacent white hard carbon layer W. The white hard carbon layer W has high hardness, a large $sp^2/sp^3$ ratio, and low density compared to those of the adjacent black hard carbon layer B. With the laminated part 1A configured by laminating such a repeating unit of the black hard carbon layer B and the white hard carbon layer W, as indicated by the results of the experimental examples, it is possible to obtain the sliding member 10 excellent in chipping resistance, wear resistance, and peeling resistance (adhesion) on the basis of the laminating effect of the hard carbon layers B, W having different properties. It should be noted that the $sp^2/sp^3$ ratio is an abbreviation of the $[sp^2/(sp^2+sp^3)]$ ratio, and is measured by a method described in the explanation section of the "$sp^2/sp^3$ ratio" described below.

With regard to hardness, the Vickers hardness of the black hard carbon layer B is preferably within a range of 700 to 1600 HV, and more preferably within a range of 750 to 1200 HV. The Vickers hardness of the white hard carbon layer W is preferably higher than the Vickers hardness of the adjacent black hard carbon layer B and within a range of 1200 to 2200 HV, and more preferably within a range of 1250 to 1900 HV.

With regard to the $sp^2/sp^3$ ratio, the $sp^2/sp^3$ ratio of the black hard carbon layer B is preferably within a range of 0.05 to 0.75. The $sp^2/sp^3$ ratio of the white hard carbon layer W is preferably larger than the $sp^2/sp^3$ ratio of the black hard carbon layer B and within a range of 0.20 to 0.80. While the black hard carbon layer B having a small $sp^2/sp^3$ ratio has a relatively large number of carbon bonds (spa bonds), represented by diamond, and thus has high density and therefore high hardness, in the present invention, the density is high, but the hardness is low. On the other hand, while the white hard carbon layer W having a large $sp^2/sp^3$ ratio has a relatively large number of carbon bonds ($sp^2$ bonds), represented by graphite, and thus has low density and therefore low hardness, in the present invention, the density is low, but the hardness is high. This is considered to be caused by the film forming process described below. It should be noted that $sp^2$ and spa can be measured by a TEM-EELS obtained by combining electron energy-loss spectroscopy (EELS) with a transmission electron microscope (TEM). It should be noted that "high," "low," "large," and "small" here mean relatively high or low and large or small between the black hard carbon layer B and the white hard carbon layer W.

With regard to a thickness ratio (T1/T2), the ratio (T1/T2) of a thickness T1 of the black hard carbon layer B to a thickness T2 of the white hard carbon layer W adjacent thereto is preferably within a range of 1/10 to 1.5/1, and more preferably within a range of 1/10 to 1/1. The thickness ratio (T1/T2) of the repeating unit is within the above-described range, and thus can be controlled as desired and be made constant or varied in the thickness direction Y of the laminated part 1A. The variation in the thickness ratio may be gradually increased or decreased, or may be set as the thickness ratio different from that of other portions at the start of film formation or at the end of film formation.

For example, in a case in which the ratio (T1/T2) of the thicknesses of the black hard carbon layer B and the white hard carbon layer W is the same or substantially the same in the thickness direction Y of the laminated part 1A, the low frictionality and the chipping resistance of each repeating unit are about the same, and thus the chipping resistance and the wear resistance can be exhibited in a stable constant state even when the wear of the laminated part 1A gradually progresses. Further, for example, in a case in which the ratio (T1/T2) of the thicknesses of the black hard carbon layer B and the white hard carbon layer W is gradually varied in the thickness direction Y of the laminated part 1A, the low frictionality and chipping resistance of the repeating unit in the initial stage of sliding and the low frictionality and chipping resistance of the repeating unit after the initial stage can be intentionally affected, and thus the chipping resistance and the wear resistance in a case in which the wear of the laminated part 1A gradually progresses can be controlled.

With regard to a thickness T, the thickness T of the repeating unit is preferably within a range of 0.2 to 2 μm. The thickness T of each repeating unit can be controlled as desired and be set within the above-described range. A total thickness of the laminated part 1A configured by laminating the repeating units in the thickness direction Y is within a range of 1 to 50 μm, preferably within the range of 3 to 30 μm.

The black hard carbon layer B has a reticular or fan-shaped structural form in whole or in part. The term "in part" refers to a surface layer side of the black hard carbon layer B, which may have a slight reticular or fan-shaped structural form, or a three-dimensional growth form that can be described as reticular or fan-shaped. With such a growth form, the black hard carbon layers B may contain the white hard carbon. Further, the triangular-wave form of the black hard carbon layers B can also be seen as a V-shape (a form that widens from the position of the pivot of the fan toward the end) or a radial shape with respect to the growth direction of the film.

Figure 4:
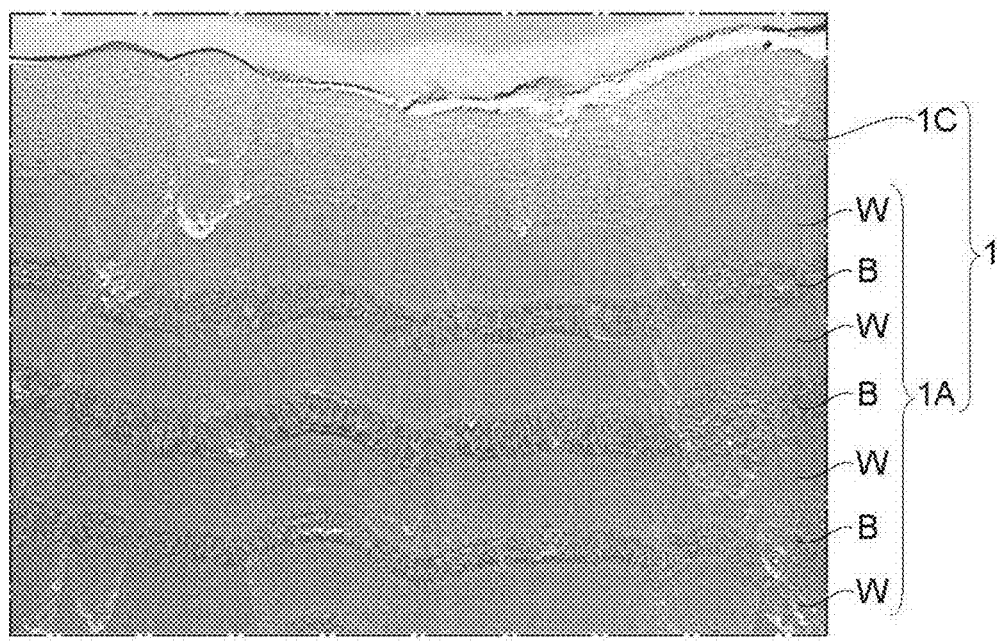
FIG. 4 is a bright-field TEM image of a cross section showing an example of the coating film.

As shown in FIG. 4, the white hard carbon layer W can be visually recognized as having a fine striped pattern, and similarly the black hard carbon layer B can also be visually recognized as having a fine reticular shape. The reason that the individual layers (white hard carbon layer W, black hard carbon layer B) in which such a striped pattern is repeated are visually recognized is conceivably based on the fact that the distance to the target changes continuously when the laminated part 1A is formed by being rotated, as in a case in which the laminated part 1A is formed on the sliding surface of a piston ring having a ring shape.

The laminated part 1A is preferably formed at a total thickness within the range of 1 to 50 μm. The thick laminated part 1A within the above-described range configured by laminating the black hard carbon layers B and the white hard carbon layers W can be formed by alternately carrying out film formation at 200° C. or less and film formation at above 200° C., for example, as the film forming temperature (substrate temperature) in a PVD method. Film formation at 200° C. or less obtains the white hard carbon layers W having a slightly large $sp^2/sp^3$ ratio. On the other hand, film formation at above 200° C. obtains the black hard carbon layers B having a small $sp^2sp^3$ ratio. The laminated part 1A can be formed into a film having a thickness within the above-described range by alternately laminating these films.

It should be noted that, in a portion of the laminated part 1A, a raised shape (not illustrated) across at least two or more laminated layers may appear. This raised shape is a portion seen as a form with a stratum raised, and as a particle or balloon shape as well. When the raised shape exists, the laminated part 1A is not aligned in the thickness direction Y or uniformly laminated, and thus the raised shape readily appears mainly in the upper half and the laminated state is seen as disarranged. However, the properties such as wear resistance and chipping resistance are not significantly affected. The formation of the raised shape is conceivably started by macroparticles during film formation.

The black hard carbon layer B and the white hard carbon layer W constituting the laminated part 1A contain almost no hydrogen on the basis of the film forming conditions. If an attempt is made to estimate the hydrogen content, it can be said that it is greater than or equal to 0.01 atom % and less than 5 atom %. The hydrogen content can be measured by hydrogen forward scattering (HFS) analysis, and preferably the remnant is substantially carbon only and does not contain substances other than N, B, Si, and other inevitable impurities.

(Surface Layer Part)

The surface layer part 1C is provided as an outermost surface layer on top of the laminated part 1A. Like the white hard carbon layer W of the laminated part 1A, the surface layer part 1C is constituted by a hard carbon layer that is relatively white when a cross section thereof is observed by a bright-field TEM image.

A Vickers hardness of the surface layer part 1C is lower than a Vickers hardness of the white hard carbon layer W of the laminated part 1A, which is the same white hard carbon layer, and within the range of 800 to 1200 HV. Then, the range (800 to 1200 HV) is about the same as the range of a Vickers hardness (700 to 1600 HV) of the black hard carbon layer B in the laminated part 1A, but is within a relatively low range. The surface layer part 1C having such a Vickers hardness conceivably acts so as to realize a reduction in friction when brought into contact with a mated member in the early stages of sliding.

The $sp^2/sp^3$ ratio of the surface layer part 1C, when compared with those of the black hard carbon layer B and the white hard carbon layer W constituting the laminated part 1A, is such that [the black hard carbon layer B<the white hard carbon layer W≤the surface layer part 1C] or [the black hard carbon layer B<the surface layer part 1C<the white hard carbon layer W]. Thus, the $sp^2/sp^3$ ratio of the surface layer part 1C composed of a white hard carbon layer is larger than that of the black hard carbon layer B and about the same as that of the white hard carbon layer W, and is the same as that of the white hard carbon layer W (laminated part 1A) which has the same relative color tone when a cross section thereof is observed by a bright-field TEM image. It should be noted that the $sp^2/sp^3$ ratio of the surface layer part 1C is within a range of 0.20 to 0.80, and preferably within a range of 0.30 to 0.60.

The white hard carbon layer constituting the surface layer part 1C has a relatively large number of carbon bonds ($sp^2$ bonds), represented by graphite, and thus has low density and therefore low hardness. It should be noted that the present invention is unique in that the range of this Vickers hardness is markedly different from that of the white hard carbon layer W constituting the laminated part 1A. Such a surface layer part 1C is formed at a film forming temperature higher than that of the individual hard carbon layers B, W constituting the laminated part 1A.

A thickness of the surface layer part 1C is within a range of 0.1 to 1.0 μm, and preferably within a range of 0.1 to 0.6 μm.

Figure 5:
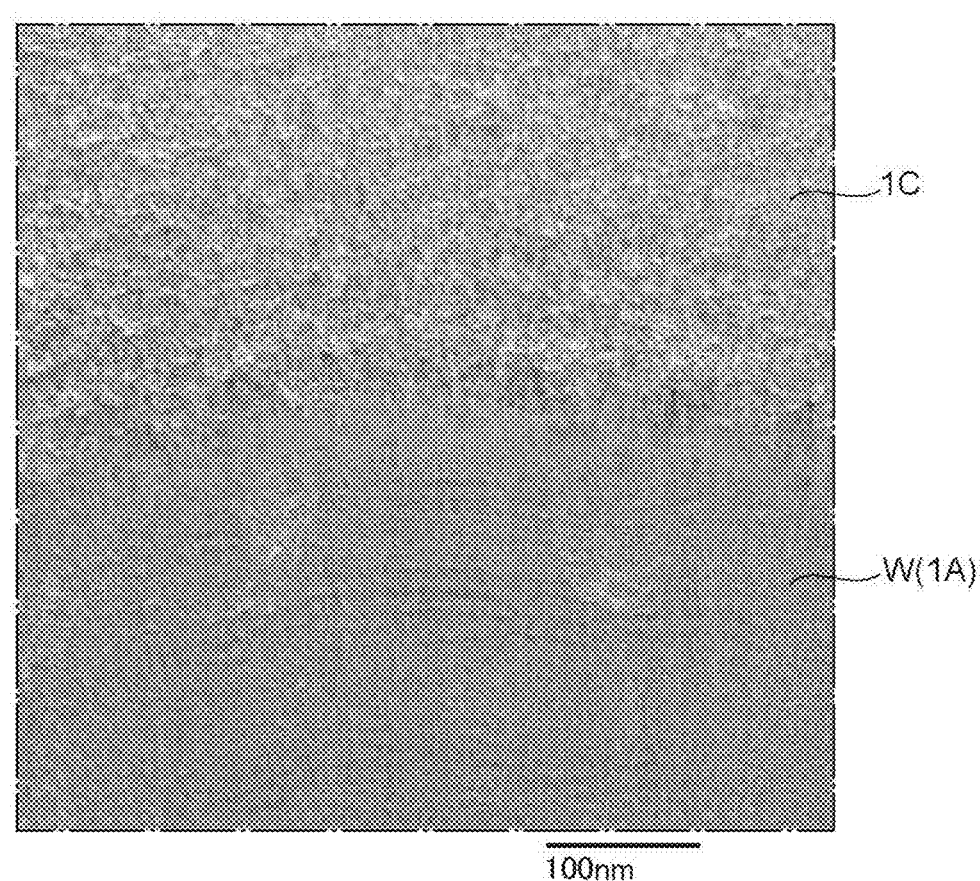
FIG. 5 is a bright-field TEM image of a cross section showing an example of a surface layer part constituting the coating film.

The surface layer part 1C can be visually recognized as a fine-granular structure, as shown in FIG. 4 and FIG. 5. The reason for this structural form is not clear, but is conceivably depended on the film forming conditions of the surface layer part 1C. The surface layer part 1C contains almost no hydrogen on the basis of the film forming conditions. If an attempt is made to estimate the hydrogen content, it can be said that it is greater than or equal to 0.01 atom % and less than 5 atom %. The hydrogen content can be measured by hydrogen forward scattering (HFS) analysis, and preferably the remnant is substantially carbon only and does not contain substances other than N, B, Si, and other inevitable impurities.

(Formation of Coating Film)

The coating film 1 can be formed by applying a PVD method such as an arc-type PVD method or a sputtering PVD method. Further, among these, formation by an arc ion plating method that uses a carbon target and does not contain hydrogen atoms in the film forming raw material is preferred. When the coating film 1 is formed by an arc ion plating method, for example, the ON/OFF of the bias voltage, control of the bias voltage value, adjustment of the arc current, heating control of the base material by the heater, forced cooling of the base material in which a cooling mechanism is introduced in a jig (holder) for setting the base material, and the like can be set as the film forming conditions.

Specifically, in the laminated part 1A, the black hard carbon layer B is formed by applying a high bias voltage, and the white hard carbon layer W is formed by applying a low bias voltage or by applying no bias voltage. In the surface layer part 1C, the film is formed by applying a bias voltage even higher than that for the black hard carbon layer B described above. Here, "high" and "low" bias voltages mean large or small absolute values. For example, if −100 V and −50 V are used as examples, −100 V is the higher bias voltage.

In the laminated part 1A, the black hard carbon layer B having an $sp^2/sp^3$ ratio of 0.05 to 0.75 is formed at a bias voltage that causes a temperature rise. The bias voltage can be set, for example, within a range of −100 to −300 V, the arc current at that time is within a range of 40 to 120 A, and the base material temperature is within a range of 100° C. to 300° C. On the other hand, the white hard carbon layer W having an $sp^2/sp^3$ ratio of 0.20 to 0.80 is formed at a bias voltage that does not cause a temperature rise. The bias voltage can be set to 0 V or, for example, within a range greater than 0 V and less than or equal to −50 V, the arc current at that time is within a range of 40 to 120 A, and the base material temperature is not risen and is gradually reduced. It should be noted that the base material temperature can be adjusted by items other than the bias voltage as well, such as the arc current, the heater temperature, and the furnace pressure.

In the surface layer part 1C, the film is formed by applying a bias voltage higher than that for the black hard carbon layer B described above. If the bias voltage during film formation of the black hard carbon layer B is, for example, −150 V, the bias voltage during film formation of the surface layer part 1C is set to a higher bias voltage (for example, −160 to −400 V, preferably −170 to −250 V). In this bias voltage range, the surface layer part 1C can be formed with the same form (fine-granulation), which has no substantial differences. Then, during film formation at such a bias voltage, the film is formed at a film forming temperature higher than that of the individual hard carbon layers B, W constituting the laminated part 1A.

($sp^2/sp^3$ Ratio)

A hard carbon layer is a film in which carbon-bonding $sp^2$ bonds represented by graphite and carbon-bonding $sp^3$ bonds represented by diamond coexist. In the present application, by electron energy-loss spectroscopy (EELS) analysis, 1s→π* intensity and 1s→σ* intensity are measured and, with 1s→π* intensity regarded as $sp^2$ intensity and 1s→σ* intensity regarded as $sp^3$ intensity, the ratio of 1s→π* intensity to 1s→σ* intensity is calculated as the [sp$^2$/(sp$^2$+sp$^3$)] ratio (also abbreviated as "sp$^2$/sp$^3$ ratio"). Accordingly, the sp$^2$/sp$^3$ ratio in the present invention, to be exact, refers to the π/σ intensity ratio. Specifically, a spectral imaging method in a STEM (scanning TEM) mode is applied and, under the conditions of an acceleration voltage of 200 kV, a sample absorbing current of 10$^{-9}$ A, and a beam spot size diameter of 1 nm, EELS obtained at a pitch of 1 nm are integrated, a C-K absorption spectrum is extracted as average information from a region of approximately 10 nm, and the sp$^2$/sp$^3$ ratio is calculated.

Figure 8:
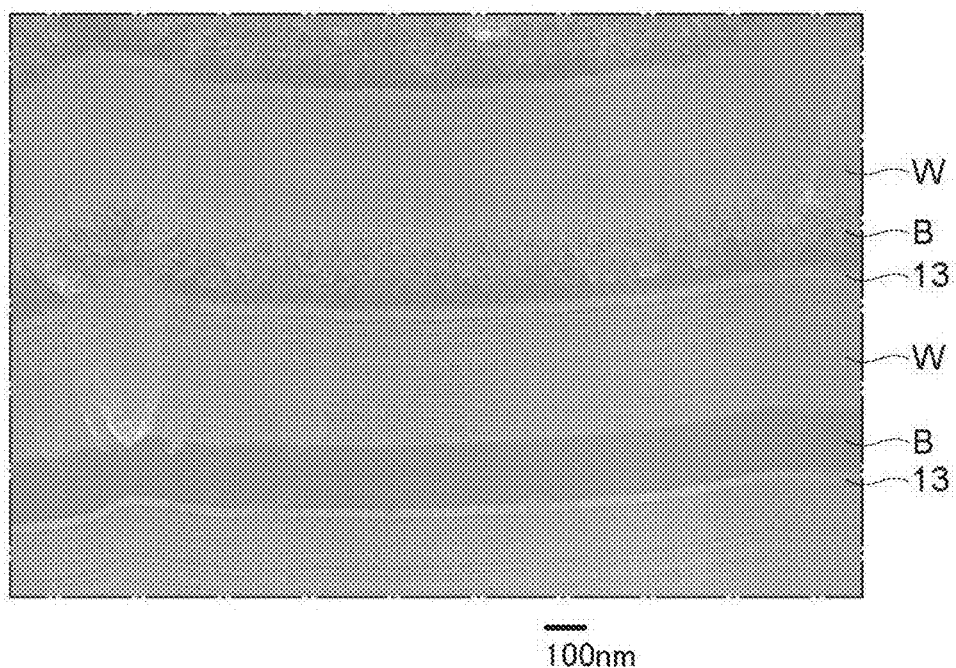
FIG. 8 is a bright-field TEM image of a cross section showing an example of a film-forming form of a carbon layer constituting the coating film.

It should be noted that, before formation of the black hard carbon layer B or before formation of the white hard carbon layer W, a bombarding treatment using a carbon target may be performed. This bombarding treatment may be performed before formation of all black and white hard carbon layers B, W, respectively, only before formation of the black hard carbon layers B, only before formation of the white hard carbon layers W, or before formation of any hard carbon layer not limited to these. Desirably, the bombarding treatment is preferably applied in the present invention because it can play a role in improving interlayer adhesion and suppressing variations in film quality. Although this bombarding treatment may be performed at any stage, preferably the bombarding treatment is performed before formation of the black hard carbon layer B, as in the example described below. In the example shown in FIG. 8, it can be seen that a carbon layer 13 (which can be rephrased as "bombarding-treatment layer or bombarding-treatment carbon layer") is formed only directly below the black hard carbon layer B by bombarding treatment before the black hard carbon layer B is formed. In the examples described below, as an example of the conditions of the bombarding treatment, the film was formed for a predetermined time to reach a thickness of approximately 20 nm at a bias voltage within a range of −750 to −1000 V and an arc current of about 40 A, but the conditions are not limited thereto and the arc current value and thickness conditions may be changed as appropriate.

EXAMPLES

The following describes the coating film and the sliding member according to the present invention in further detail using experimental examples and reference examples.

Experimental Example 1

A piston ring was applied as the sliding member 10. On the piston ring base material 11 (88-mm diameter, 2.9-mm ring width in the radial direction, 1.2-mm ring width in the axial direction) composed of C: 0.65 mass %, Si: 0.38 mass %, Mn: 0.35 mass %, Cr: 13.5 mass %, Mo: 0.3 mass %, P: 0.02 mass %, S: 0.02 mass %, remnant: iron and inevitable impurities, a nitrided layer of 40 μm was formed by nitriding treatment, and a chromed metal layer having a thickness of 0.2 μm was formed as the intermediate layer 12 by an ion plating method. Then, on the intermediate layer 12, repeating units of the black hard carbon layer B and the white hard carbon layer W were constituted by using an arc ion plating device with a carbon target to form the laminated part 1A and, subsequently the surface layer part 1C was formed on the laminated part 1A. It should be noted that the carbon layer 13 having a thickness of 20 nm was formed by a bombarding treatment (bias voltage: −1000 V, arc current: 40 A) before formation of the black hard carbon layer B.

The black hard carbon layer B constituting the laminated part 1A was arc-discharged for 10 minutes at a bias voltage of −150 V and an arc current of 40 A to form the black hard carbon layer B having the thickness T1 of 0.18 μm. The white hard carbon layer W to be formed thereon was arc-discharged (arc current: 40 A) for 20 minutes at a bias voltage of −30 V to form the white hard carbon layer W having the thickness T2 of 0.35 μm. The thickness T of the repeating unit was 0.53 μm, and film formation of this repeating unit was performed 20 times to obtain the laminated part 1A having a total thickness of 10.6 μm.

Next, the surface layer part 1C was formed on the laminated part 1A. The surface layer part 1C was arc-discharged for 30 minutes at a bias voltage of −170 V and an arc current of 40 A, and formed to include the white hard carbon layer having a thickness of 0.50 μm. A total thickness of the laminated part 1A and the surface layer part 1C was 11.1 μm.

[Observation of Structural Form]

Bright-field TEM images of the cross section of the coating film 1 thus formed were taken. Sectional images of the coating film 1 were obtained by taking images of the cross section of the coating film 1 using a bright-field TEM at an acceleration voltage of 200 kV. TEM images of the coating film 1 obtained in Experimental Example 1 are shown in FIG. 4 and FIG. 5. As shown in FIG. 4 and FIG. 5, in the laminated part 1A, it could be confirmed that the black hard carbon layers B, relatively shown in black, and the white hard carbon layers W, relatively shown in white, were alternately laminated in the thickness direction. Further, it was seen that the white hard carbon layer W had a fine stripe pattern, and the black hard carbon layer B had a reticular or fan-shaped structural form in whole or in part. The surface layer part 1C appeared to have a fine-granular structural form. Furthermore, as understood from the TEM image in FIG. 8, the carbon layer 13 formed by the bombarding treatment can be visually recognized directly below each of the black hard carbon layers B.

Further, the total thickness of the coating film 1, the thickness of the black hard carbon layers B, the thickness of the white hard carbon layers W, and the thickness of the surface layer part 1C were found from the bright-field TEM images. For thickness measurement, a piston ring with the coating film 1 formed near a center of an effective coating range of a used arc ion plating device, and a piston ring with the coating film 1 formed near an upper end and a lower end were adopted as measurement samples. It should be noted that the ratio (T1/T2) of the thickness T1 of the black hard carbon layers B to the thickness T2 of the white hard carbon layers W was 0.18/0.35=0.51.

[Vickers Hardness and sp$^2$/sp$^3$ Ratio]

With regard to Vickers hardness, a Vickers hardness of the black hard carbon layer B was within a range of 700 to 1100 HV, and a Vickers hardness of the white hard carbon layer W was higher than a Vickers hardness of the adjacent black hard carbon layer B and within a range of 1200 to 1900 HV. A Vickers hardness of the surface layer part 1C was lower than the Vickers hardness of the white hard carbon layer W of the laminated part 1A, which was the same white hard carbon layer, and within a range of 900 to 1200 HV. It should be noted that the range (900 to 1200 HV) was about the same as the range of the Vickers hardness (700 to 1600 HV) of the black hard carbon layer B in the laminated part 1A, but was within a relatively low range.

It should be noted that, with the thickness T (=T1+T2) of the repeating unit in Experimental Example 1 being a thin 0.53 μm, the thickness T1 of the black hard carbon layer B being a thin 0.18 μm, the thickness T2 of the white hard carbon layer W being a thin 0.35 μm, and the thickness of the surface layer part 1C being a thin 0.50 measurement of Vickers hardness of each single layer in the cross section is almost impossible, even with the current highest level measurement technology. Further, even if an attempt is made to measure the hardness from the surface, the measurement is affected by the hardness of the lower layer due to the thin thickness, making it difficult even with the current highest level measurement technology. Therefore, the Vickers hardness here was evaluated on the basis of the results of thickly forming and measuring the black hard carbon layer B only, the white hard carbon layer W only, and the surface layer part 1C only, without changing the film forming conditions.

Specifically, because hardness depends on the film forming temperature, given $T_B$ as the base material temperature at the end of film formation of the black hard carbon layer B accompanied by a temperature rise and $T_W$ as the base material temperature at the end of film formation of the white hard carbon layer W accompanied by a temperature reduction, $T_B > T_W$. To form a single layer of the black hard carbon layer B, the black hard carbon layer B was formed to 0.18 μm and subsequently cooled until the base material temperature dropped to $T_W$. Then, as soon as the base material temperature reached $T_W$, film formation of the black hard carbon layer B was started, and the layer was formed to 0.18 μm. Subsequently, the cooling until the base material temperature dropped to $T_W$ and the film formation of the black hard carbon layer B were repeated, obtaining a single-layer film with only the black hard carbon layers B being formed. On the other hand, to form a single layer of the white hard carbon layer W, the white hard carbon layer W was formed to 0.35 μm and subsequently heated by a heater until the base material temperature rose to $T_B$. Then, as soon as the base material temperature reached $T_B$, film formation of the white hard carbon layer W was started, and the layer was formed to 0.35 μm. Subsequently, the heating until the base material temperature rose to $T_B$ and the film formation of the white hard carbon layer W were repeated, obtaining a single-layer film with only the white hard carbon layer W being formed. In this way, in the measurement of hardness from the surface, the single-layer films of the black hard carbon layer B and the white hard carbon layer W, formed to film thickness not affected by the base material (6 μm or greater), were each adjusted to a surface roughness of about Ra 0.05 and measured for Vickers hardness from the surface layer with a Vickers hardness meter under a load of 100 gf. In this experimental example, evaluation was carried out by the Vickers hardness measured by this method. The surface layer part was also measured for Vickers hardness by the same means.

The $sp^2/sp^3$ ratio of the laminated part 1A was within a range of 0.05 to 0.55 in each portion of the black hard carbon layers B, and within a range of 0.20 to 0.70 in each portion of the white hard carbon layers W. Further, the surface layer part 1C was observed to have a white hard carbon layer formed in a fine-granular structural form, shown by the relative white color. Furthermore, the $sp^2/sp^3$ ratio of the surface layer part 1C was within a range of 0.40 to 0.55 in each portion of the surface layer part 1C. It should be noted that the $sp^2/sp^3$ ratios of the black hard carbon layer B, the white hard carbon layer W, and the surface layer part 1C were measured in each portion, but were not measured at the boundaries with other layers because the values may vary due to influence of other layers at the boundaries.

[Wear Resistance, Chipping Resistance, Low Frictionality, and Peeling Resistance]

Figure 7:
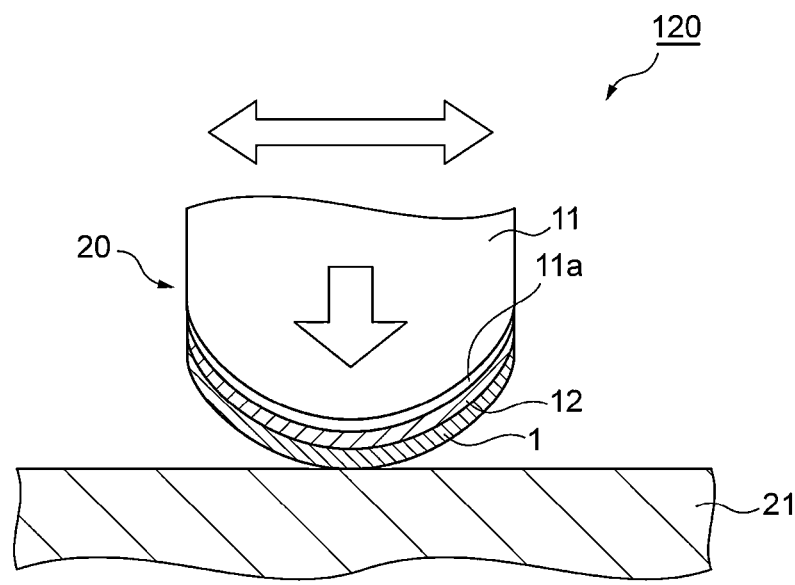
FIG. 7 is a schematic view of a friction-wear testing method by an SRV tester.

Various properties of the formed coating film 1 were obtained by a friction-wear testing method using a Schwingungs Reihungund and Verschleiss (SRV) tester 120 generally used in the evaluation of sliding members for automobiles. Specifically, with a sliding surface of a friction-wear test sample 20 brought into contact with SUJ2 material serving as a sliding object 21 as illustrated in FIG. 7, the friction-wear test sample 20 was reciprocally slid for 10 minutes and for 60 minutes while applying a load of 1000 N, by using 5W-30 (with Mo-DTC) as the lubricant, and the sliding surface of the friction-wear test sample 20 was observed under a microscope. In FIG. 7, reference numeral 12 denotes the intermediate layer, and reference numeral 1 denotes the coating film.

It was confirmed that the obtained coating film 1 was free of peeling as well as chipping, and included a coating film exhibiting constant and stable chipping resistance and wear resistance and having excellent peeling resistance (adhesion).

[Measurement of Friction Coefficient]

The friction coefficient was measured by a movable liner-type friction tester. The results are shown in Table 1. When a friction coefficient of the coating film 1 in Experimental Example 1 was compared with a friction coefficient ratio with a friction coefficient of Comparative Experimental Example 1 described below set at 100, a friction reducing effect of up to 26% was recognized in the area from a mixed lubrication area to a boundary lubrication area.

TABLE 1

|  | Friction Coefficient Ratio |
|---|---|
| Experimental Example 1 | 74 |
| Experimental Example 2 | 67 |
| Comparative Experimental Example 1 | 100 |
| Comparative Experimental Example 2 | 112 |

As described above, the coating film 1 obtained in Experimental Example 1 had favorable chipping resistance and wear resistance and favorable aggressiveness against the mated material as well, and thus exhibited stable sliding properties with respect to both the coating film 1 and the mated material. Such characteristics are particularly desirable for sliding members such as piston rings to which high loads are applied and coating films and, compared to sliding members that do not have these characteristics, a sliding member exhibiting constant and stable chipping resistance and wear resistance and having excellent peeling resistance (adhesion) can be obtained. Furthermore, this coating film 1 includes the surface layer part 1C in the outermost surface and thus can realize a reduction in friction when brought into contact with a mated member in the early stages of sliding.

Experimental Example 2

A piston ring was applied as the sliding member 10 in this Experimental Example 2 as well, and the nitrided layer and the intermediate layer 12 were also formed as in Experimental Example 1 by using the same piston ring base material 11 as that in Experimental Example 1. As in Experimental Example 1, on the intermediate layer 12, repeating units of the black hard carbon layer B and the white hard carbon layer W were also constituted to form the laminated part 1A and the surface layer part 1C and obtain the coating film 1, by using an arc ion plating device with a carbon target. It should be noted that, in this Experimental Example 2 as well, as in Experimental Example 1, the carbon layer 13 was formed by a bombarding treatment before formation of the black hard carbon layer B.

As the film forming conditions in this Experimental Example 2, the surface layer part 1C was arc-discharged for 30 minutes at a bias voltage of −230 V and an arc current of 40 A, and formed to include the white hard carbon layer having a thickness of 0.55 µm. The other film forming conditions for the laminated part 1A were the same as those in Experimental Example 1. The total thickness of the laminated part 1A and the surface layer part 1C was 11.2

[Evaluation of Experimental Example 2]

Evaluation of each characteristic and the like is the same as that of the method described above. Bright-field TEM images of the cross section of the coating film 1 in Experimental Example 2 also showed a form similar to that in FIG. 4 and FIG. 5. Further, the carbon layer 13 also showed a form similar to that in FIG. 8. A Vickers hardness of the black hard carbon layer B in the laminated part 1A was within a range of 700 to 1100 HV, and a Vickers hardness of the white hard carbon layer W was higher than a Vickers hardness of the adjacent black hard carbon layer B and within a range of 1200 to 1900 HV. A Vickers hardness of the surface layer part 1C was lower than the Vickers hardness of the white hard carbon layer W of the laminated part 1A, which was the same white hard carbon layer, and within a range of 800 to 1100 HV.

The $sp^2/sp^3$ ratio of the laminated part 1A was within a range of 0.05 to 0.55 in each portion of the black hard carbon layers B, and within a range of 0.20 to 0.70 in each portion of the white hard carbon layers W. Further, the surface layer part 1C was observed to have a white hard carbon layer formed in a fine-granular structural form, shown by the relative white color. Furthermore, the $sp^2/sp^3$ ratio of the surface layer part 1C was within a range of 0.45 to 0.65.

It was confirmed that the obtained coating film 1 was free of peeling as well as chipping, and included a coating film exhibiting constant and stable chipping resistance and wear resistance and having excellent peeling resistance (adhesion). As the results of the friction coefficient, as shown in Table 1 described above, when the coating film 1 in Experimental Example 1 was compared with a friction coefficient ratio with a friction coefficient of Comparative Experimental Example 1 described below set at 100, a friction reducing effect of up to 33% was recognized in the area from a mixed lubrication area to a boundary lubrication area.

Comparative Experimental Example 1

A piston ring was applied as the sliding member 10 in this Comparative Experimental Example 1, and the nitrided layer and the intermediate layer 12 were also formed as in Experimental Example 1 by using the same piston ring base material 11 as that in Experimental Example 1. As in Experimental Example 1, on the intermediate layer 12, repeating units of the black hard carbon layer B and the white hard carbon layer W were also formed into a film by using an arc ion plating device with a carbon target to obtain the coating film 1. It should be noted that, in this comparative experimental example as well, as in Experimental Example 1, the carbon layer 13 was formed by a bombarding treatment before formation of the black hard carbon layer B.

As the film forming conditions in this Comparative Experimental Example 1, the surface layer part 1C was arc-discharged for 10 minutes at a bias voltage of −150 V (which was the same value as that of the black hard carbon layer B) and an arc current of 40 A, but the thickness was thinned to 0.18 µm, about ⅓ of that in Experimental Example 1. The other film forming conditions for the laminated part 1A were the same as those in Experimental Example 1. The total thickness of the laminated part 1A and the surface layer part 1C was 10.8 µm.

[Evaluation of Comparative Experimental Example 1]

Evaluation of each characteristic and the like is the same as that of the method described above. The coating film 1 in Comparative Experimental Example 1 also showed a form similar to that in FIG. 4 and FIG. 5 for the laminated part 1A. A Vickers hardness of the black hard carbon layer B in the laminated part 1A was within a range of 700 to 1100 HV, and a Vickers hardness of the white hard carbon layer W was higher than a Vickers hardness of the adjacent black hard carbon layer B and within a range of 1200 to 1900 HV. Further, the $sp^2/sp^3$ ratio of the laminated part 1A was within a range of 0.05 to 0.55 in each portion of the black hard carbon layers B, and within a range of 0.20 to 0.70 in each portion of the white hard carbon layers W. It should be noted that the surface layer part 1C did not show a form similar to that in FIG. 4 and FIG. 5.

It was confirmed that the obtained coating film 1 was free of peeling as well as chipping, and included a coating film exhibiting constant and stable chipping resistance and wear resistance and having excellent peeling resistance (adhesion). The friction coefficient results showed a friction coefficient higher than in the previously described Experimental Example 1.

Comparative Experimental Example 2

A piston ring was applied as the sliding member 10 in this Comparative Experimental Example 2, and the nitrided layer and the intermediate layer 12 were also formed as in Experimental Example 1 by using the same piston ring base material 11 as that in Experimental Example 1. As in Experimental Example 1, on the intermediate layer 12, repeating units of the black hard carbon layer B and the white hard carbon layer W were also formed into a film by using an arc ion plating device with a carbon target to obtain the coating film 1 without the surface layer part 1C. It should be noted that, in this comparative experimental example as well, as in Experimental Example 1, the carbon layer 13 was formed by a bombarding treatment before formation of the black hard carbon layer B.

In this Comparative Experimental Example 2, the surface layer part 1C was not formed. The other film forming conditions for the laminated part 1A were the same as those in Experimental Example 1. A thickness of the coating film 1 was 10.6 µm.

[Evaluation of Comparative Experimental Example 2]

Evaluation of each characteristic and the like is the same as that of the method described above. The coating film 1 in Comparative Experimental Example 2 showed a form similar to that in FIG. 4 and FIG. 5 for the laminated part 1A. As the results of the friction coefficient, as shown in Table 1 described above, when the coating film 1 in Experimental Example 1 was compared with a friction coefficient ratio with a friction coefficient of the previously described Comparative Experimental Example 1 set at 100, a friction increase of up to 12% was confirmed in the area from a mixed lubrication area to a boundary lubrication area.

SUMMARY

The results of Experimental Examples 1 and 2 and Comparative Experimental Examples 1 and 2 were summarized. As a result, the laminated part 1A included the black hard carbon layer B having a reticular or fan-shaped structural form in whole or in part, and the surface layer part 1C had a fine-granular structural form. Further, a Vickers hardness of the black hard carbon layer B in the laminated part 1A was within a range of 700 to 1600 HV, and a Vickers hardness of the white hard carbon layer W was higher than a Vickers hardness of the adjacent black hard carbon layer B and within a range of 1200 to 2200 HV. A Vickers hardness of the surface layer part 1C was lower than the Vickers hardness of the white hard carbon layer W and within the range of 800 to 1200 HV.

While the above has described the present invention on the basis of embodiments, the present invention is not limited to the embodiments described above. Various changes can be made to the embodiments described above within the same scope as and equivalent scope to the present invention.

DESCRIPTIONS OF REFERENCE NUMERALS

1 Coating film
1A Laminated part
1C Surface layer part
10 Sliding member (Piston ring)
11 Base material (Piston ring base material)
11a Underlayer
12 Intermediate layer
13 Carbon layer formed by bombarding treatment
16 Sliding surface
20 Friction-wear test sample
21 Sliding object
120 SRV tester
B Black hard carbon layer
W White hard carbon layer
Y Thickness direction

What is claimed is:

1. A sliding member comprising:
a coating film on a sliding surface on a base material,
the coating film including, when a cross section thereof is observed by a bright-field TEM image, a laminated part configured by laminating, in a thickness direction, repeating units including black hard carbon layers, relatively shown in black, and white hard carbon layers, relatively shown in white, and a surface layer part composed of a white hard carbon layer provided on the laminated part,
a Vickers hardness of the black hard carbon layer being within a range of 700 to 1600 HV, a Vickers hardness of the white hard carbon layer being higher than a Vickers hardness of the black hard carbon layer adjacent thereto and within a range of 1200 to 2200 HV, and a Vickers hardness of the surface layer part being lower than the Vickers hardness of the white hard carbon layer and within a range of 800 to 1200 HV.

2. The sliding member according to claim 1, wherein [sp$^2$/(sp$^2$+sp$^3$)] ratios of the black hard carbon layer and the white hard carbon layer adjacent to each other and an [sp$^2$/(sp$^2$+sp$^3$)] ratio of the surface layer are such that [the black hard carbon layer<the white hard carbon layer≤the surface layer part] or [the black hard carbon layer<the surface layer part≤the white hard carbon layer].

3. The sliding member according to claim 1, wherein the surface layer part has a thickness within a range of 0.1 to 1.0 μm, and the repeating unit has a thickness within a range of 0.2 to 2 μm.

4. The sliding member according to claim 1, wherein the [sp$^2$/(sp$^2$+sp$^3$)] ratio of the black hard carbon layer is within a range of 0.05 to 0.75, the [sp$^2$/(sp$^2$+sp$^3$)] ratio of the white hard carbon layer is larger than the [sp$^2$/(sp$^2$+sp$^3$)] ratio of the black hard carbon layer and within a range of 0.20 to 0.80, and the [sp$^2$/(sp$^2$+sp$^3$)] ratio of the surface layer part is within a range of 0.20 to 0.80.

5. The sliding member according to claim 1, further comprising:
a carbon layer directly below the black hard carbon layer and/or directly below the white hard carbon layer.

6. The sliding member according to claim 1, wherein, when a cross section thereof is observed by a bright-field TEM image, a hard carbon base film is provided between the base material or an intermediate layer provided on the base material, and the coating film.

7. The sliding member according to claim 1, wherein the sliding member is a piston ring.

8. A manufacturing method of the sliding member according to claim 1 that includes the coating film on the sliding surface on the base material,
the coating film including, when a cross section thereof is observed by a bright-field TEM image, a laminated part configured by laminating, in a thickness direction, repeating units including black hard carbon layers, relatively shown in black, and white hard carbon layers, relatively shown in white, and a surface layer part composed of a white hard carbon layer provided on the laminated part,
the manufacturing method comprising:
forming the coating film with a film forming temperature of the surface layer part being higher than a film forming temperature of the laminated part.

9. A coating film comprising:
when a cross section thereof is observed by a bright-field TEM image,
a laminated part configured by laminating, in a thickness direction, repeating units including black hard carbon layers, relatively shown in black, and white hard carbon layers, relatively shown in white; and
a surface layer part composed of a white hard carbon layer provided on the laminated part,
a Vickers hardness of the black hard carbon layer being within a range of 700 to 1600 HV, a Vickers hardness of the white hard carbon layer being higher than a Vickers hardness of the black hard carbon layer adjacent thereto and within a range of 1200 to 2200 HV, and a Vickers hardness of the surface layer part being lower than the Vickers hardness of the white hard carbon layer and within a range of 800 to 1200 HV.

10. The coating film according to claim 9, wherein [sp$^2$/(sp$^2$+sp$^3$)] ratios of the black hard carbon layer and the white hard carbon layer adjacent to each other and an [sp$^2$/(sp$^2$+sp$^3$)] ratio of the surface layer are such that [the black hard carbon layer<the white hard carbon layer≤the surface layer part] or [the black hard carbon layer<the surface layer part≤the white hard carbon layer].

* * * * *